US012752460B2

(12) United States Patent
Toncelli

(10) Patent No.: US 12,752,460 B2
(45) Date of Patent: Oct. 6, 2026

(54) MACHINE FOR PROCESSING SLABS

(71) Applicant: Dario Toncelli, Bassano del Grappa (IT)

(72) Inventor: Dario Toncelli, Bassano del Grappa (IT)

( * ) Notice: Subject to any disclaimer, the term of this patent is extended or adjusted under 35 U.S.C. 154(b) by 861 days.

(21) Appl. No.: 17/792,901

(22) PCT Filed: Jan. 26, 2021

(86) PCT No.: PCT/IB2021/050576
§ 371 (c)(1),
(2) Date: Jul. 14, 2022

(87) PCT Pub. No.: WO2021/152449
PCT Pub. Date: Aug. 5, 2021

(65) Prior Publication Data
US 2023/0060723 A1 Mar. 2, 2023

(30) Foreign Application Priority Data
Jan. 31, 2020 (IT) ........................ 102020000001954

(51) Int. Cl.
*B28D 1/00* (2006.01)
*B28D 1/18* (2006.01)
*B28D 7/04* (2006.01)

(52) U.S. Cl.
CPC ............... *B28D 1/003* (2013.01); *B28D 1/18* (2013.01); *B28D 7/04* (2013.01)

(58) Field of Classification Search
CPC .......... B28D 1/04; B28D 1/043; B28D 1/044; B28D 1/047; B28D 1/18; B28D 1/003;
(Continued)

(56) References Cited

U.S. PATENT DOCUMENTS 4,123,190 A 10/1978 Baudot

FOREIGN PATENT DOCUMENTS

DE 4308032 A1 * 9/1994 ........... B23D 47/042
EP 1591427 A1 * 11/2005 ............... B28D 7/04
(Continued)

OTHER PUBLICATIONS

DE4308032—Machine Translation (Year: 1994).*
(Continued)

*Primary Examiner* — Brian D Keller
*Assistant Examiner* — Alberto Saenz
(74) *Attorney, Agent, or Firm* — Fredrikson & Byron, P.A.

(57) ABSTRACT

Machine (1) for processing slabs (L) comprising a device (14) for transporting the slabs (L) between two zones, at least one of which is a machining zone along a feeding direction (X), means (16, 17) for supporting and clamping the slabs during machining, said means being designed to clamp the slabs (L) in a machining position, at least one tool (4) for machining the slabs which is mounted on a spindle, the at least one tool (4) being operative in the machining zone. The machine (1) comprises means (50) for moving the transporting device (14), configured to move the transporting device (14) from a working position corresponding substantially to the position for machining the slabs (L) into a position spaced at least vertically from the working position, and vice versa; the transporting device (14) is a conveyor belt.

17 Claims, 10 Drawing Sheets

(58) Field of Classification Search
CPC ...... B23D 47/02; B23D 47/04; B23D 47/042; B23D 47/045; B23D 47/047; B23D 47/06; B23D 47/08; B24B 27/0015; B24B 27/0023; B24B 27/0046; B24B 27/0069; B24B 27/0076; B24B 27/0608; B24B 27/0616; B24B 21/04; B24B 21/18; B24B 41/005; B24B 7/06
USPC ..................... 269/35, 37, 55, 303; 125/13.01
See application file for complete search history.

(56) References Cited

FOREIGN PATENT DOCUMENTS

| | | | | |
|---|---|---|---|---|
| EP | 1666221 A1 | | 6/2006 | |
| IT | 1391207 B | | 11/2011 | |
| IT | VI20110165 A1 | | 12/2012 | |
| WO | WO-2018203516 A1 | * | 11/2018 | ............. C03C 19/00 |
| WO | WO-2019021172 A1 | * | 1/2019 | ............. B28D 1/003 |

OTHER PUBLICATIONS

WO2018203516—Machine Translation (Year: 2018).*
PCT International Search Report and Written Opinion dated Apr. 28, 2021 for International Application No. PCT/IB2021/050576, from which the instant application is based, 11 pages.

* cited by examiner

MACHINE FOR PROCESSING SLABS

RELATED APPLICATIONS

This application is a 35 U.S.C. 371 national stage filing from International Application No. PCT/IB2021/050576, filed Jan. 26, 2021, which claims priority to Italian Application No. 102020000001954, filed Jan. 31, 2020, the teachings of which are incorporated herein by reference.

FIELD OF THE INVENTION

The present invention relates to a machine for processing slabs.

Preferably, the machine according to the present invention is intended for the machining of slabs of natural stone, agglomerate, ceramic or glass material.

Furthermore, the processing machine is a numerical control machine, preferably a machine for shaping and/or contouring slabs.

A further subject of the present invention is a method for processing slabs which uses the aforementioned processing machine.

BACKGROUND

In the prior art numerical control machines comprising one or more mobile machining units with respective tools are known.

The movement of the machining unit is performed by means of suitable movement means which generally comprise a beam slidably supported at its end by a pair of sidewalls, a spindle-support carriage slidably mounted on the beam and a sleeve mounted on the spindle-support carriage and slidable along a respective vertical direction.

A spindle or electro-spindle with a respective tool-holder nose for mounting the tool and transmission of the movement to the tool is mounted at the bottom end of the sleeve. With particular reference to shaping or contouring machines, the tools designed to be used for machining of the slabs may be for example drill bits, edge-shaping tools and milling cutters.

In particular, the drill bits are used to form through-recesses in the slabs; the slabs machined using these methods are intended to provide preferably kitchen or bathroom surfaces. Moreover, the tool may be removed or replaced with a different tool so that the machine may carry out different machining operations on the same slab or on different slabs.

For this purpose, the machine may also comprise a magazine for depositing the tools and a mechanism for automatically changing the tool.

The formation of the through-recesses in the slabs produces waste material or swarf which is separated from the slab being machined and must be subsequently disposed of.

The machine may comprise a fixed support bench with a workpiece support table on which the slab to be machined is fixed, usually by means of suckers.

An example of this type of processing machine is described in Italian patent IT1391207.

Alternatively, the numerical control machine may comprise a device for transporting the slabs, preferably a conveyor belt, which allows the feeding of the slabs from a slab loading zone into a zone for unloading the machined slabs passing through a machining zone.

In the continuation of the present description reference will be made solely to this latter type of processing machine.

In order to prevent the machining tool from striking the upper surface of the conveyor belt and damaging it, the slabs must be arranged spaced from the conveyor belt before the start of the machining operation.

Therefore, during machining, the bottom surface of the slab is spaced from the upper surface of the conveyor belt by a predetermined displacement height.

For this purpose, the machine may comprise means for raising the slab, preferably pneumatic cylinders, which are positioned in the machining zone below the slab feeding plane.

The cylinders are designed to raise the slabs until the upper surface of the slabs comes into contact with fixed abutments mounted on the machine frame.

The pistons of the cylinders and the abutments therefore act as elements for supporting and clamping the slabs at the predetermined raising height during the machining operation.

At the end of the machining process, the pistons are lowered so that the slab is deposited on the conveyor belt; the conveyor belt is then operated so as to transport the machined slab towards the unloading zone.

During a machining operation which involves the formation of through-recesses in the slab, the waste material and swarf fall onto the conveyor belt.

Therefore, before proceeding with the transportation of the machined slab towards the unloading zone, the machining waste and swarf must be removed from the conveyor belt.

This operation is performed by activating the conveyor belt when the slab is still raised and being machined; activation of the conveyor belt may be repeated until the swarf has been completely removed.

After completely freeing the conveyor belt of the machining waste and swarf, the slab thus machined is positioned again on the conveyor belt so as to be transported into the unloading zone of the machine.

One drawback of these solutions consists in the fact that the swarf falls onto the belt from a certain height, namely from the raising height and may damage the upper surface of the conveyor belt.

Another drawback consists in the fact that very often the swarf becomes detached from the slab before the recess has been completed; this may result in splintering of the edges of the slab which have just been cut.

A further drawback consists in the fact that, during the surface contouring operations, for example in order to form blind recesses or depressions, the tool presses against the slab and tends to bend it. Bending of the slab may generate machining errors which negatively affect the finished product.

BRIEF SUMMARIES OF OBJECTS OF THE INVENTION

The main object of the present invention is to provide a machine for processing slabs which is able to overcome the aforementioned drawbacks.

A particular task of the present invention is to provide a machine of the type described above which eliminates or at least limits damage to the conveyor belt caused by the falling of machining swarf.

A further task of the present invention is to provide a machine of the type described above which limits the formation of splinters or flaking of the cut edges of the slabs during machining.

A further task of the present invention is to provide a machine of the type described above which avoids the bending of the slabs during surface machining by the tools.

A further task of the present invention is to provide a machine of the type described above which provides a stable support for the slabs both during transportation thereof and during machining thereof.

A further task of the present invention is to provide a method for processing slabs by means of the aforementioned machine which allows the operating conditions to be modified in a simple and rapid manner depending on the characteristics of the slabs.

The object and the main tasks described above are achieved with a machine for processing slabs according to claim 1 and methods for processing the slabs according to other c.

BRIEF DESCRIPTIONS OF THE DRAWINGS

In order to illustrate more clearly the innovative principles of the present invention and its advantages compared to the prior art, non-limiting examples of embodiment will be described below with the aid of the accompanying drawings. In the drawings:

FIGS. 1 and 2 show, respectively, a front view and side view of the machine according to the present invention;

FIGS. 3*a*-3*d* show respective side views of a detail of the machine indicated by the letter "A" in FIG. 2 in different operating positions.

Figure 7:
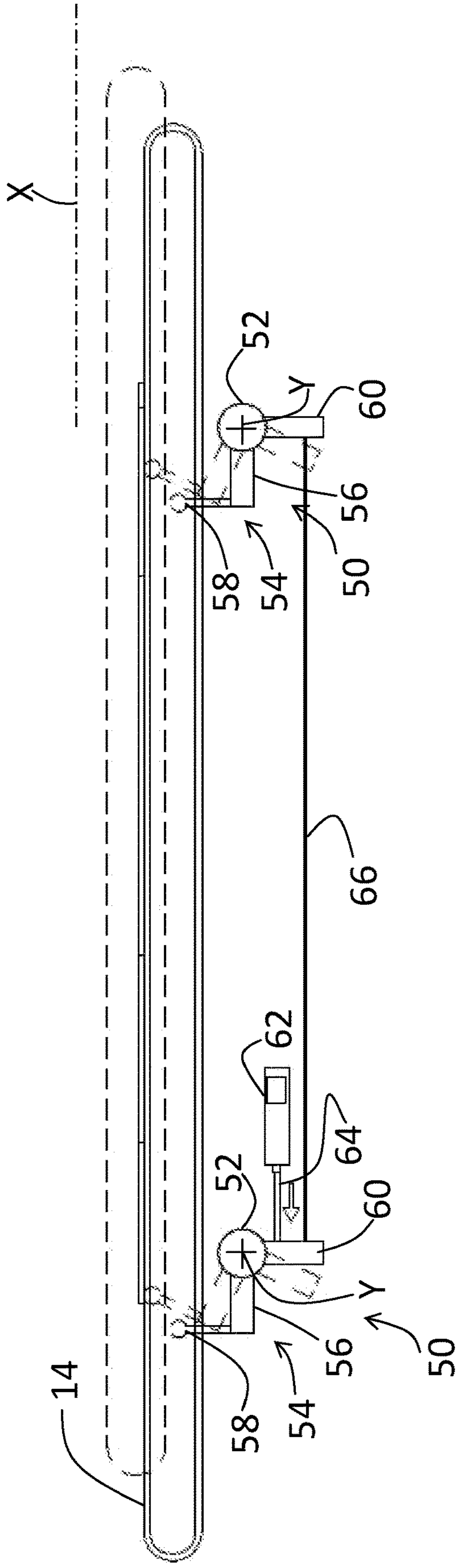
Figure 8:
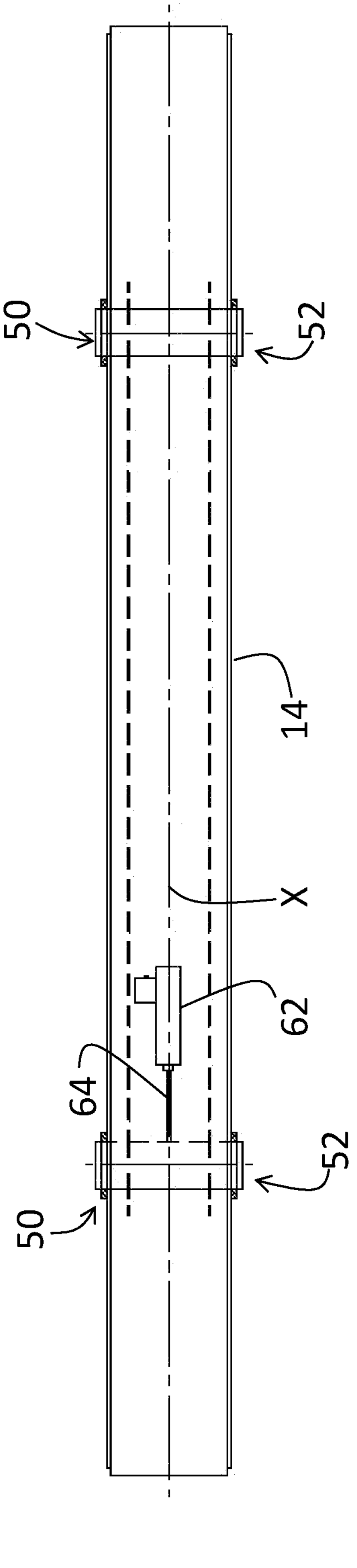

FIGS. 6*a*-6*d* show respective side views of an alternative embodiment of the detail of the machine shown in FIGS. 3*a*-3*d* in different operating positions;

FIGS. 7 and 8 show, respectively, a front view and top plan view of the transporting device of the machine according to the present invention.

DETAILED DESCRIPTION OF EMBODIMENTS OF THE INVENTION

The figures show a machine for processing slabs, denoted overall by the reference number 1. Preferably, the machine is intended for the machining of slabs of natural stone, agglomerate, ceramic or glass material.

The processing machine is a numerical control machine and comprises a processor unit, not shown in the figures, for controlling the movements of the machine components.

Moreover, the machine 1 according to the present invention is intended preferably for carrying out shaping and contouring operations on slabs and, as such, may be equipped with suitable machining tools.

Figure 1:
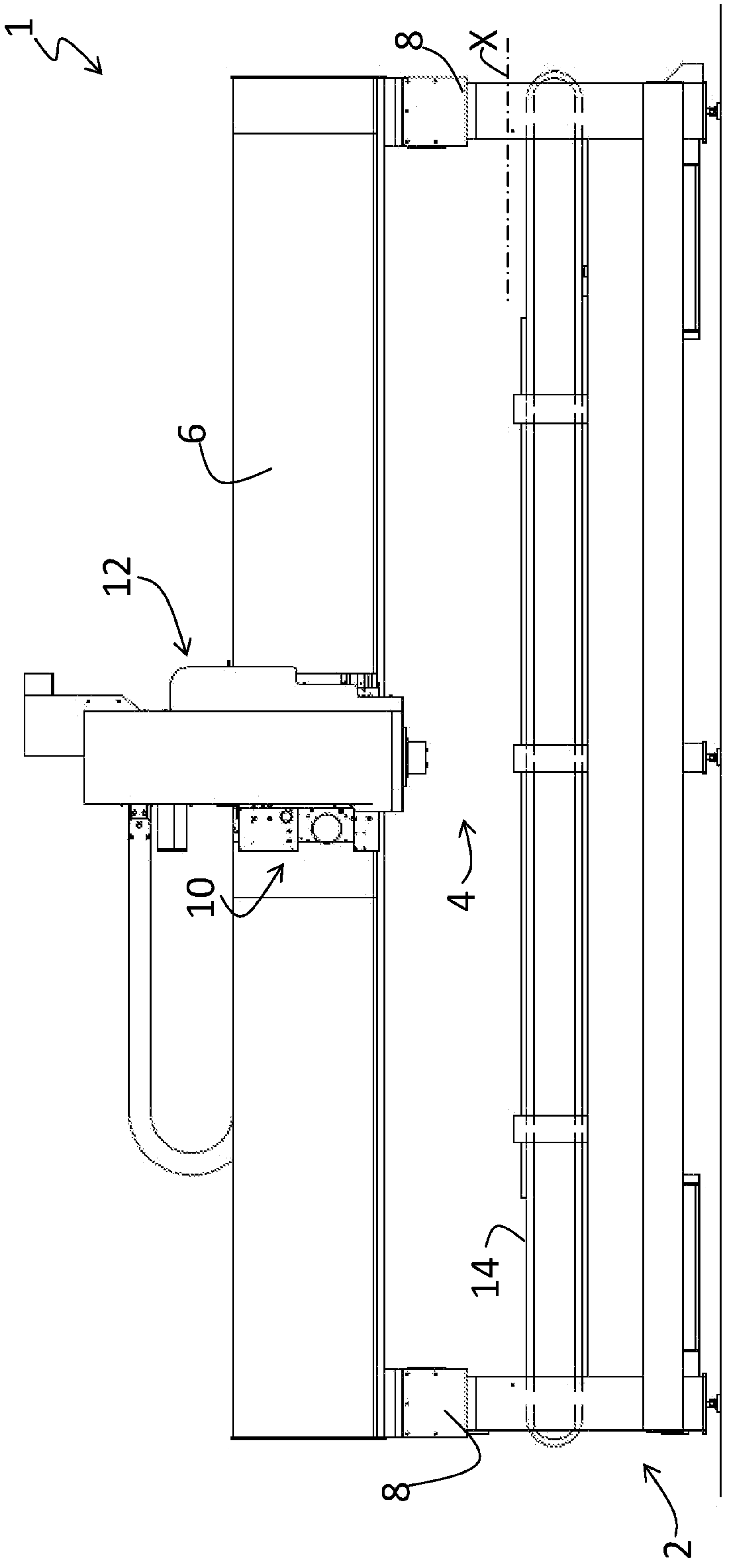
Figure 2:
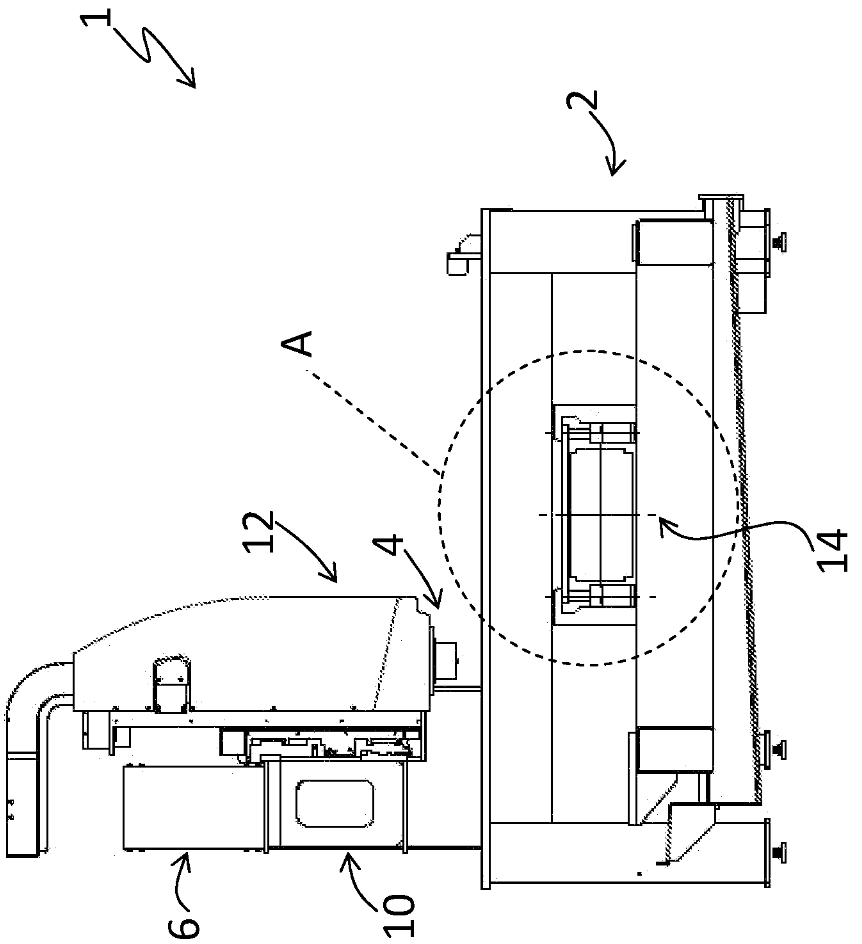

As shown more clearly in FIGS. 1 and 2, the machine 1 comprises a fixed frame 2 and at least one tool 4 mounted on a spindle and operative in a machining zone in which the slab L to be machined is positioned.

Figure 4:
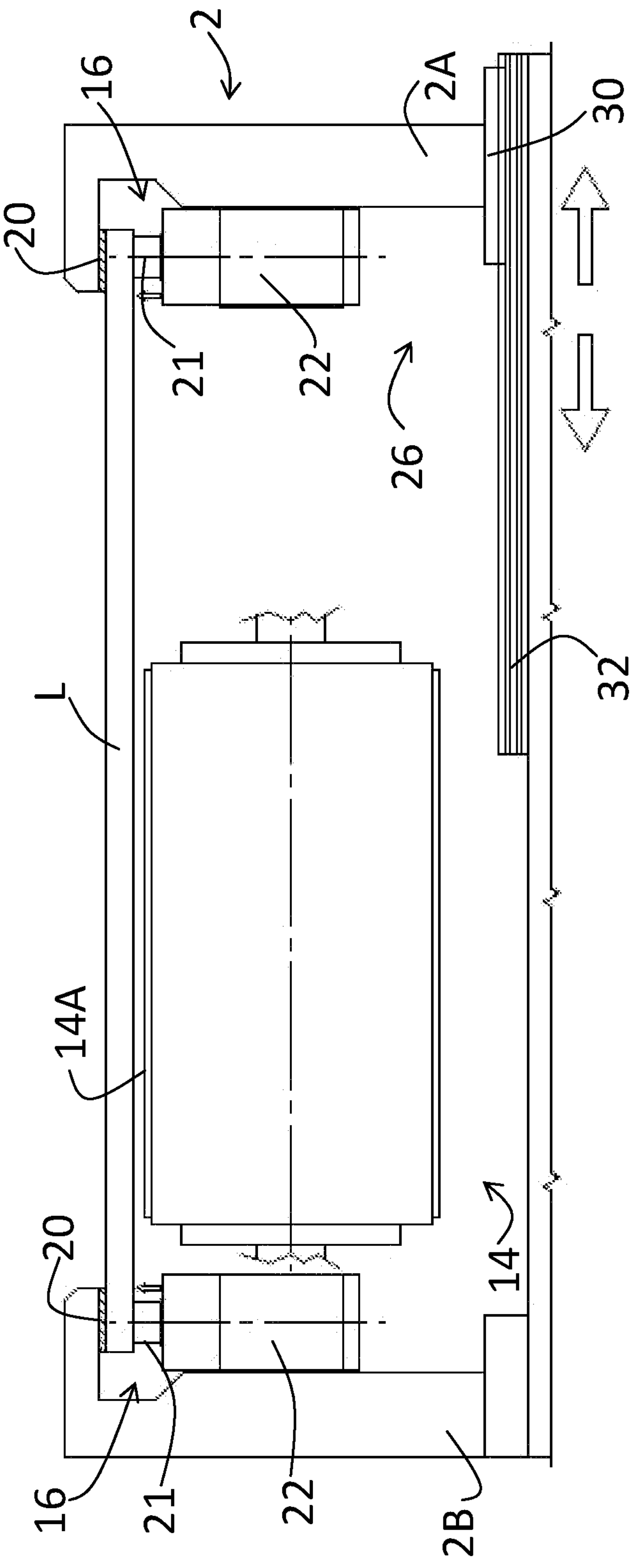
FIG. 4 shows a side view of an alternative embodiment of the detail of the machine shown in FIGS. 3*a*-3*d;*
Figure 5:
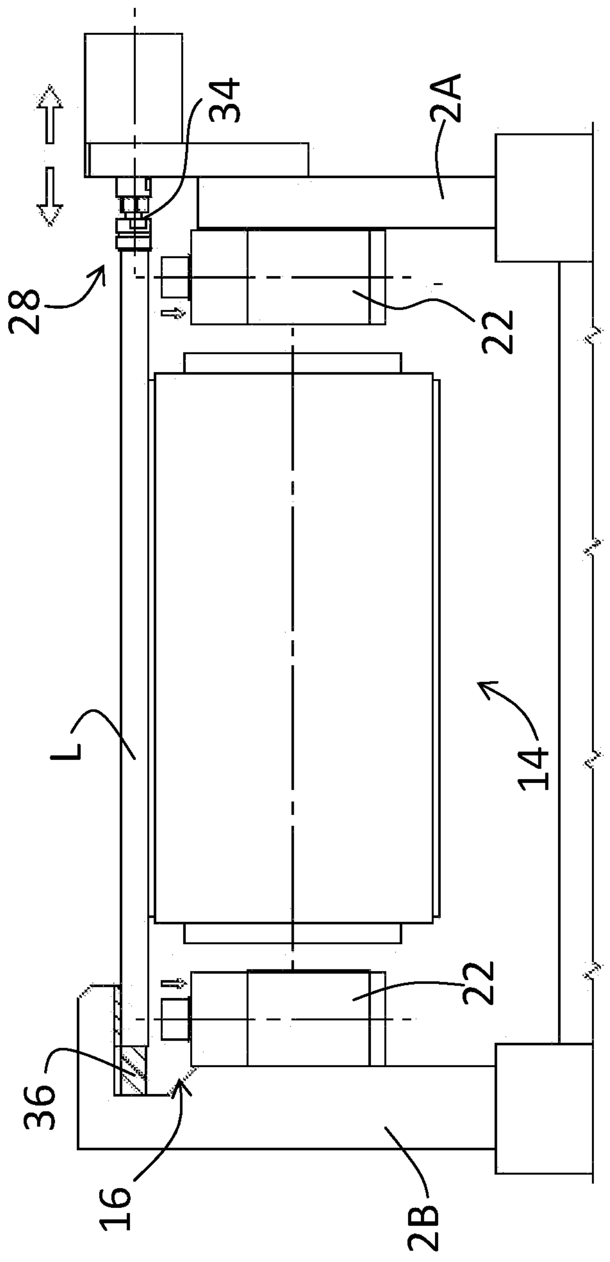
FIG. 5 shows a side view of a further alternative embodiment of the detail of the machine shown in FIGS. 3*a*-3*d;*
Figure 6A:
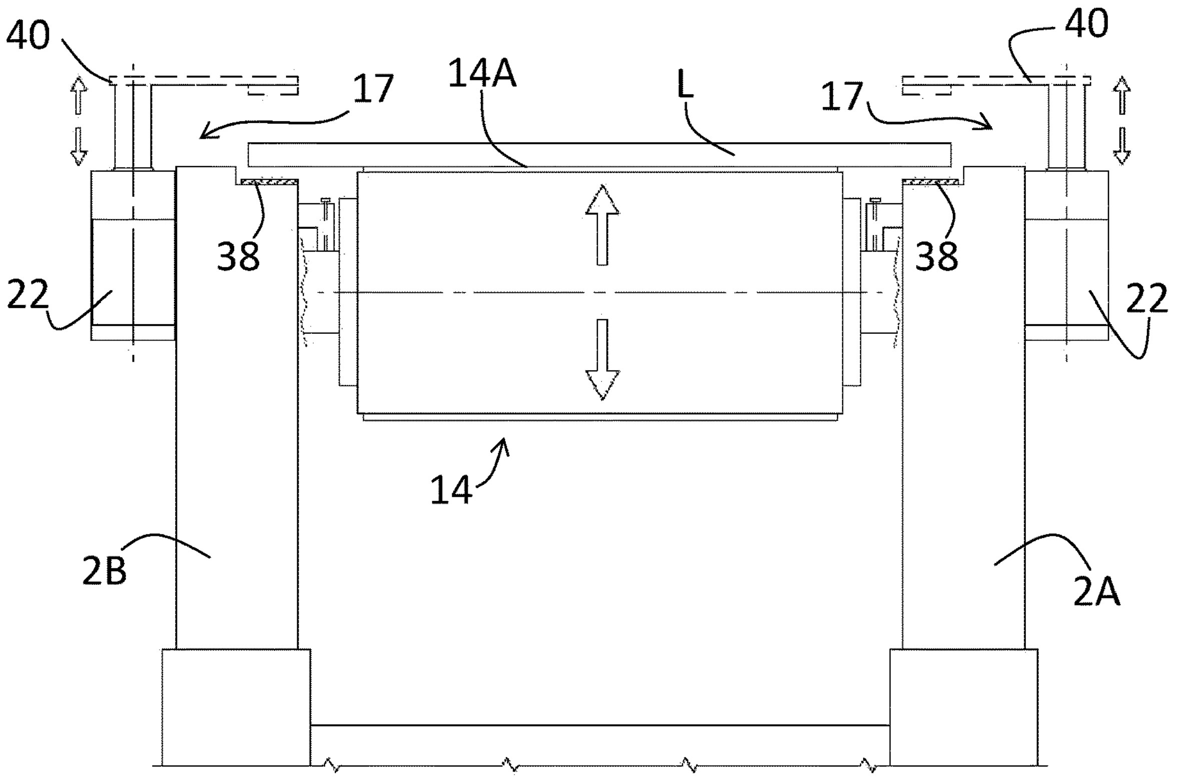
Figure 6B:
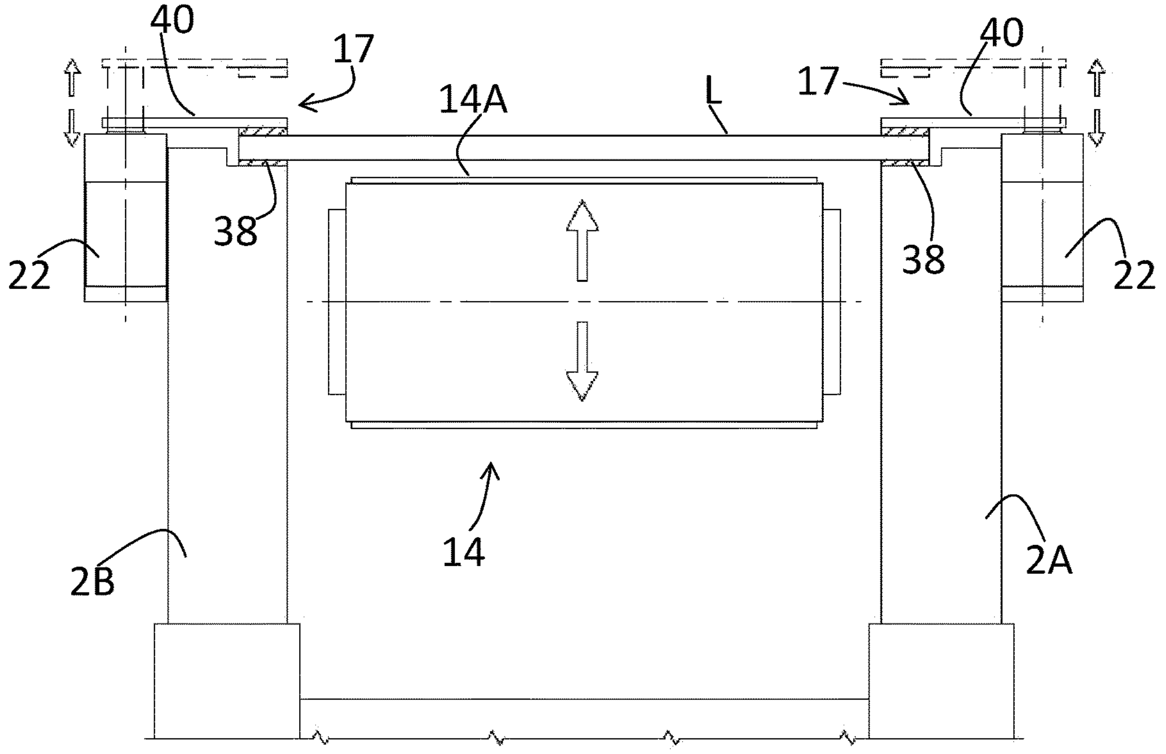
Figure 6C:
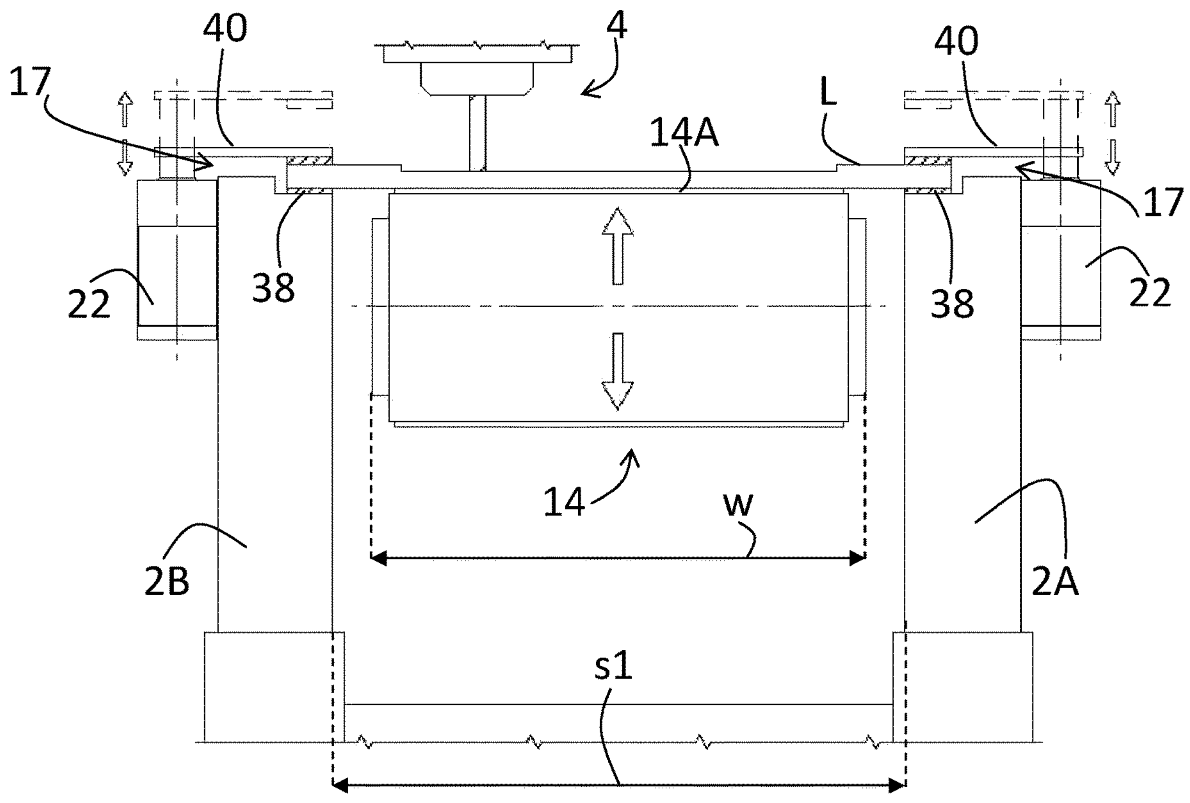

The frame 2 comprises a pair of sidewalls 2A, 2B, as shown more clearly in FIGS. 3*a*-3*d*, 4-5 and 6*a*-6*d*, and these sidewalls 2A, 2B are positioned at a predetermined distance s1, as shown for example in FIG. 6*c*.

The tool 4 is movable in the machining zone and its movement is performed by means of suitable movement means.

As shown in FIGS. 1 and 2, these movement means comprise a beam 6 positioned at the top and transversely with respect to a pair of support structures 8 positioned at the ends of the machine 1.

The beam 6 is supported at its ends by the two support structures 8 and is slidable along a transverse direction on the support structures 8.

Moreover, the movement means comprise a spindle-support carriage 10 mounted slidably on the beam 6 along a longitudinal direction and a sleeve 12 mounted on the spindle-support carriage 10 and configured to slide with respect to the spindle-support carriage 10 along a vertical direction.

The tool 4 is mounted on the tool-holder nose of the spindle which is in turn mounted at the bottom end of the sleeve 12. Therefore, the movement of the sleeve 12 along the vertical direction allows the machining tool 4 to be moved closer to or away from the slab L to be machined.

Depending on the type of machining operation to be performed, the tool 4 may be chosen from the group which comprises drill bits, edge-shaping tools and milling cutters.

Obviously, tools different from those indicated above may be used, without thereby departing from the scope of protection of the present invention.

The tool may be replaced with different tools which are kept inside a magazine, not shown in the figures, when they are not used.

Furthermore the machine 1 comprises:

- a device 14 for transporting the slabs L between two zones, at least one of which is a machining zone;
- means 16, 17 for supporting and clamping the slabs L during machining, the supporting and clamping means 16, 17 being positioned in the machining zone.

As shown in the attached figures, the transporting device 14 is a conveyor belt designed to transport the slabs L along a predetermined longitudinal feeding direction X, in particular from a loading zone to the machining zone and from the machining zone to an unloading zone.

Furthermore, the machine 1 may also comprise a first rollerway and a second rollerway, not shown in the figures, which are positioned in the slab loading zone and unloading zone.

The supporting and clamping means 16, 17 are designed to clamp the slab L in a machining position.

Figure 3A:
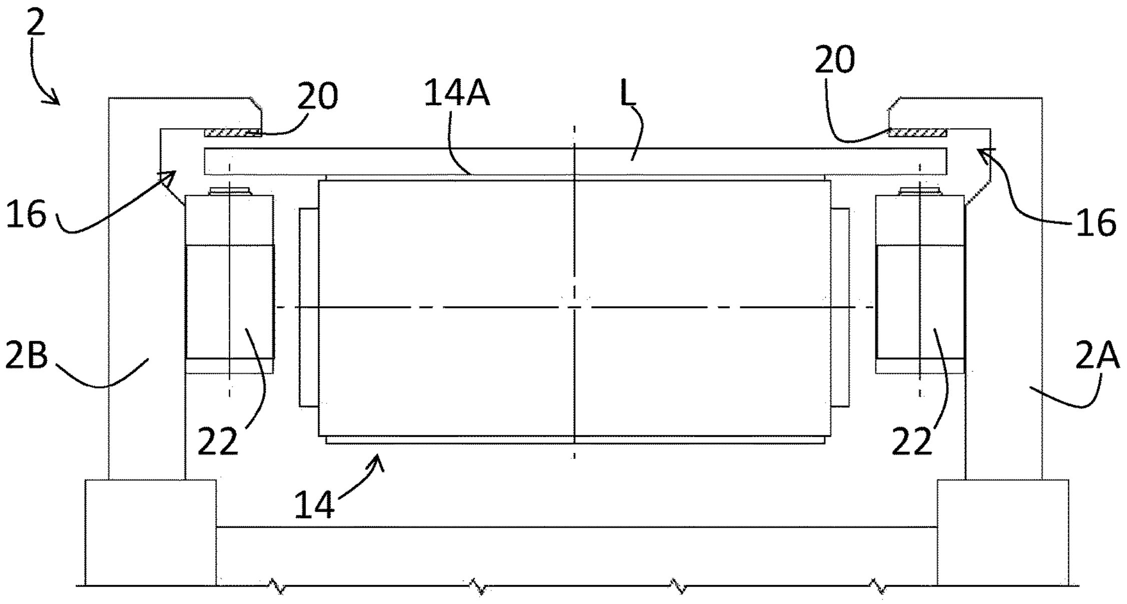
Figure 3B:
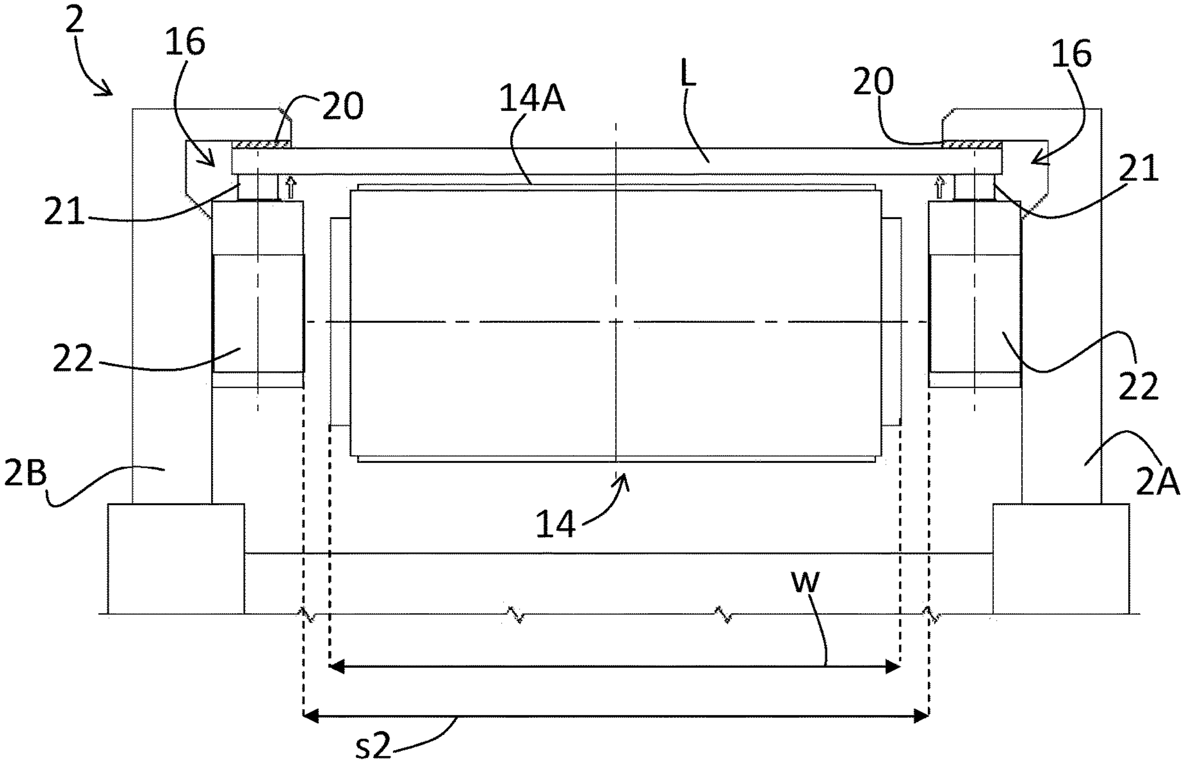

As is already known, in the machining position the slab L is not supported by the conveyor belt 14, as occurs during feeding, but by the supporting and clamping means 16, 17, as shown in FIGS. 3*b* and 6*b*.

Moreover, in the machining position, the slab L is at a height from the ground greater than the height at which it is located when it advances on the transporting device 14, as described in detail below.

The present invention also envisages at least two embodiments of the supporting and clamping means, shown in FIGS. 3*a*-3*d*, 4-5 and in FIGS. 6*a*-6*d*, respectively, and indicated by the reference numbers 16 and 17, respectively.

In both the embodiments, the supporting and clamping means 16, 17 comprise two pairs of cylinders 22 which are positioned laterally on opposite sides of the conveyor belt 14, in particular one pair on one side of the conveyor belt 14 and the other pair on the opposite side.

In the first embodiment the cylinders 22 are provided with pistons intended to raise the slabs L in relation to the conveyor belt 14.

The pistons are housed inside the cylinders 22 and therefore are not visible in the figures. Moreover, these supporting and clamping means 16 comprise two pairs of abutments

20 mounted on the frame 2. FIGS. 3*a* to 6*d* show a single pair of cylinders 22 and a single pair of abutments 20.

In particular one pair of abutments is mounted on a sidewall 2A, and the other pair is mounted on the other sidewall 2B of the frame 2, as is each of the cylinders 22.

In accordance with this configuration, the pairs of cylinders 22 are positioned at a predetermined distance s2, as shown for example in FIG. 3*b*. The width w of the conveyor belt 14 is similar to this predetermined distance s2.

The cylinders 22 are positioned below the feeding plane defined by the upper surface 14A of the conveyor belt 14.

Each abutment 20 is aligned along a vertical direction with the respective cylinder 22 and arranged in a position raised in relation thereto and to the feeding plane of the slab L.

Then, after the slab L had been transported into the machining zone by the conveyor belt 14, the stems 21 of the pistons are raised so as to bring the slab L into the machining position pressed against the abutments 20, as shown in FIG. 3*b*.

In this operative position, the stems 21 support the slab L in the machining position.

It is pointed out that, in order for the pistons to be able to raise the slab L with respect to the conveyor belt 14, the latter must have a width smaller than the width of the slab L. In this way the slab L projects laterally on opposite sides of the conveyor belt 14.

The machine 1 may also comprise means 26 for adjusting the position of the cylinders 22 and the abutments 20 with respect to the conveyor belt 14 depending on the width of the slab L and means 28 for aligning the slabs with respect to the conveyor belt 14.

The adjustment means 26 are shown more clearly in FIG. 4 and may comprise a slide 30 which is slidable along guides 32 and on which a sidewall 2A of the frame 2 with a pair of cylinders 22 and a pair of abutments 20 is mounted. The other sidewall 2B is instead fixed and not adjustable.

In this way it is possible to adjust the distance between the two sidewalls 2A, 2B of the frame 2, and therefore the distance between the cylinders and the abutments of one sidewall with respect to the cylinders and abutments of the other sidewall, depending on the width of the slabs to be machined.

In accordance with this configuration, the predetermined distance s2 between the cylinders 22 is greater than the width w of the conveyor belt 14.

The alignment means 28 are shown more clearly in FIG. 5 and may comprise at least one motorized thrusting cylinder 34, preferably two thrusting cylinders, and a respective stop 36 positioned on the opposite side of the conveyor belt 14.

The thrusting cylinder 34 may be positioned on one of the two sidewalls 2A of the frame 2 and is designed to act on the slab L along a direction substantially parallel to the ground and perpendicular to the feeding direction X so as to bring the slab L up against the stop 36 positioned on the other sidewall 2B of the frame 2.

The second embodiment of the means 17 for supporting and clamping the slabs shown in FIGS. 6*a*-6*d* comprises, for each sidewall 2A, 2A, a pair of substantially horizontal supports 38 parallel to the ground and at least one pair of vertically slidable grippers 40.

Therefore two pairs of grippers 40 and two pairs of supports 38 are also provided in this embodiment.

The grippers 40 are mounted on the sliding stems 21 of the respective cylinder pistons 22 and are positioned in a raised position with respect to the supports 38.

The width w of the conveyor belt 14, in this second embodiment, is similar to the distance s1 between the sidewalls 2A, 2B of the frame 2, as shown in FIG. 6*c*, since the cylinders 22 are mounted on the sidewalls 2A, 2B on the outside of the frame 2 compared to the first embodiment.

In this embodiment, the supports 38 act as a support for the slabs L, while the grippers 40 are lowered vertically so as to clamp the slabs L against the supports 38. The supports define the machining position for the slab L.

It is pointed out that the machining position of the slabs, in both embodiments, is located above the conveyor belt 14.

In accordance with the present invention means 50 are provided for moving the transporting device 14, namely the conveyor belt, which are illustrated more clearly in a particular embodiment shown in FIGS. 7 and 8.

These movement means 50 are configured to move the transporting device 14 from a working position substantially corresponding to the position for machining the slab L into a position spaced at least vertically from the working position, and vice versa.

In particular, the movement means 50 are designed to move the conveyor belt 14 from a raised working position substantially corresponding to the position for machining the slab L into a lowered position spaced from the working position, and vice versa.

In the raised position the conveyor belt 14 is positioned at a greater height from the ground than when it is positioned in the lowered position.

Therefore, in accordance with this embodiment, the conveyor belt 14 is moved along at least a vertical direction perpendicular to the ground.

The movement means 50 may also be configured to move the conveyor belt 14 into a position which is raised with respect to the position for machining the slabs L.

Figure 3C:
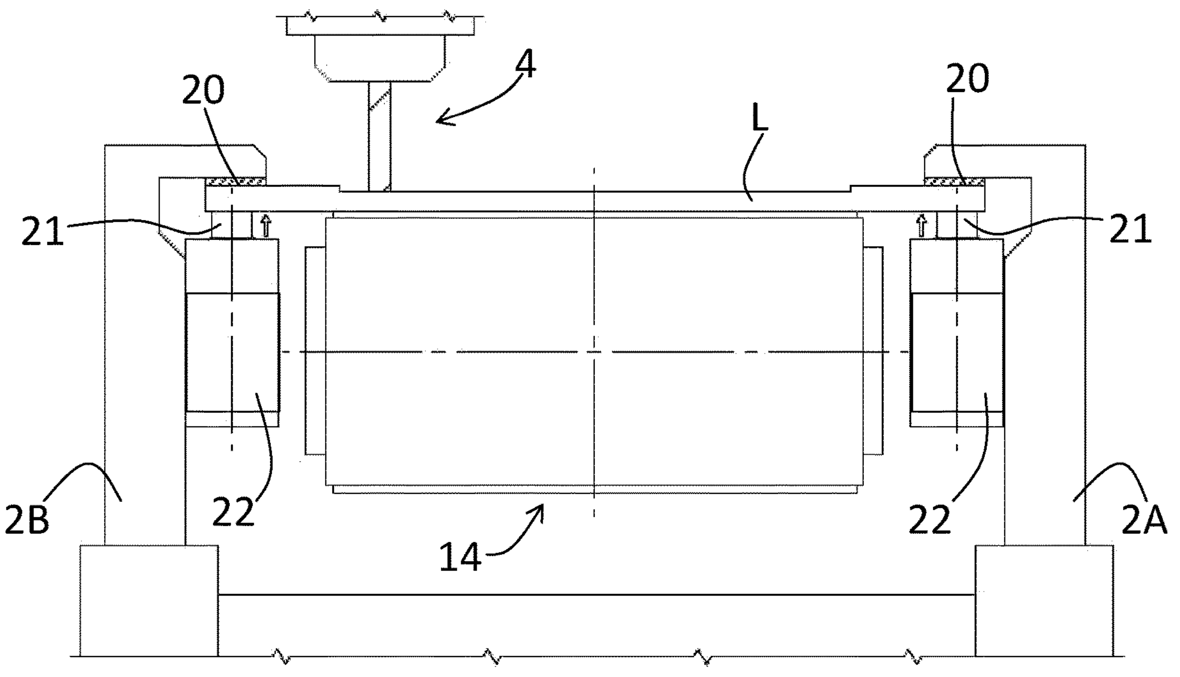
Figure 3D:
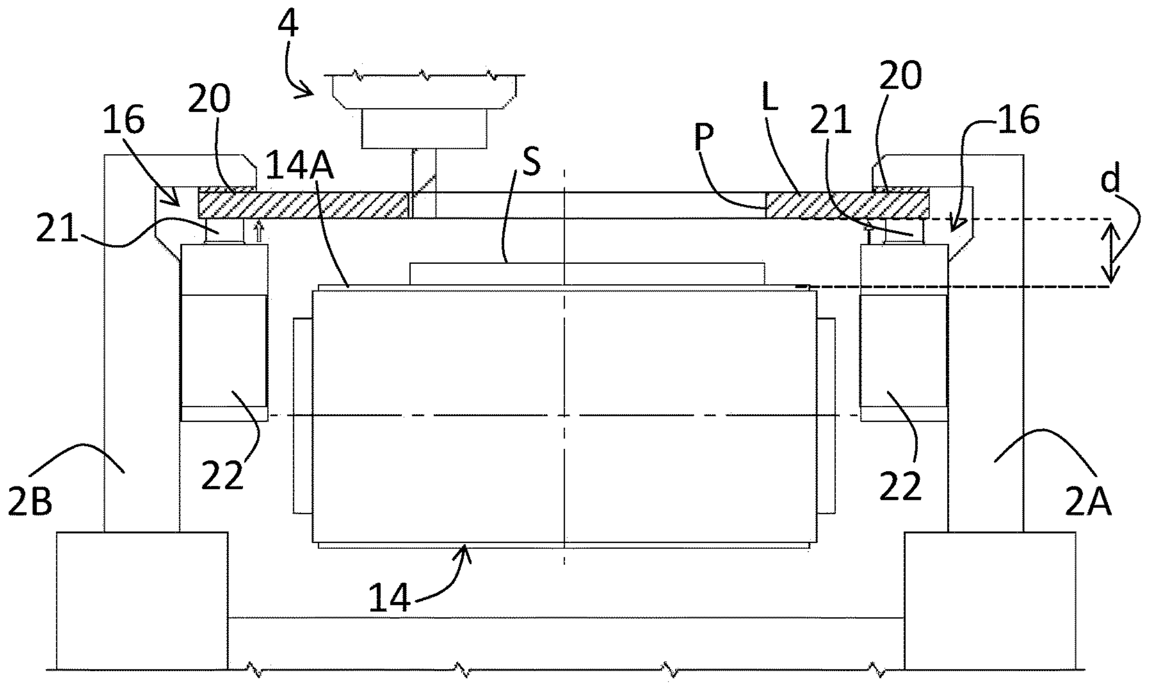

With reference to the first embodiment of the supporting and clamping means 16, the conveyor belt 14 is shown in the raised position in FIG. 3*c* and in the lowered position shown in FIG. 3*d*.

In particular, in the raised position, the upper surface 14A of the conveyor belt 14 is in contact with the bottom surface of the slab L so as to support it and prevent it bending during the surface contouring operations carried out on the slab L.

In the lowered position the conveyor belt 14 is kept at a predetermined distance d from the slab L after the slab has been clamped, allowing collection of the machining swarf S which falls from the slab L onto the conveyor belt 14 during the formation of through-recesses P, as shown in FIG. 3*d*.

The machining swarf S is removed by means of activation of the conveyor belt 14 while the slab L is still clamped in the machining position.

Moreover, by keeping the conveyor belt 14 at a certain safety distance d from the slab L the risk of the tool 4 striking the belt 14 during the machining operations and damaging it is avoided.

The distance d may also be varied and adjusted depending on the thickness of the slab L to be machined so as to limit the falling height of the machining swarf S and prevent flaking and splintering of the slab L.

In the configuration described above the movement of the conveyor belt 14 by means of the movement means 50 is performed following raising and clamping of the slab L by the supporting and clamping means 16.

Figure 6D:
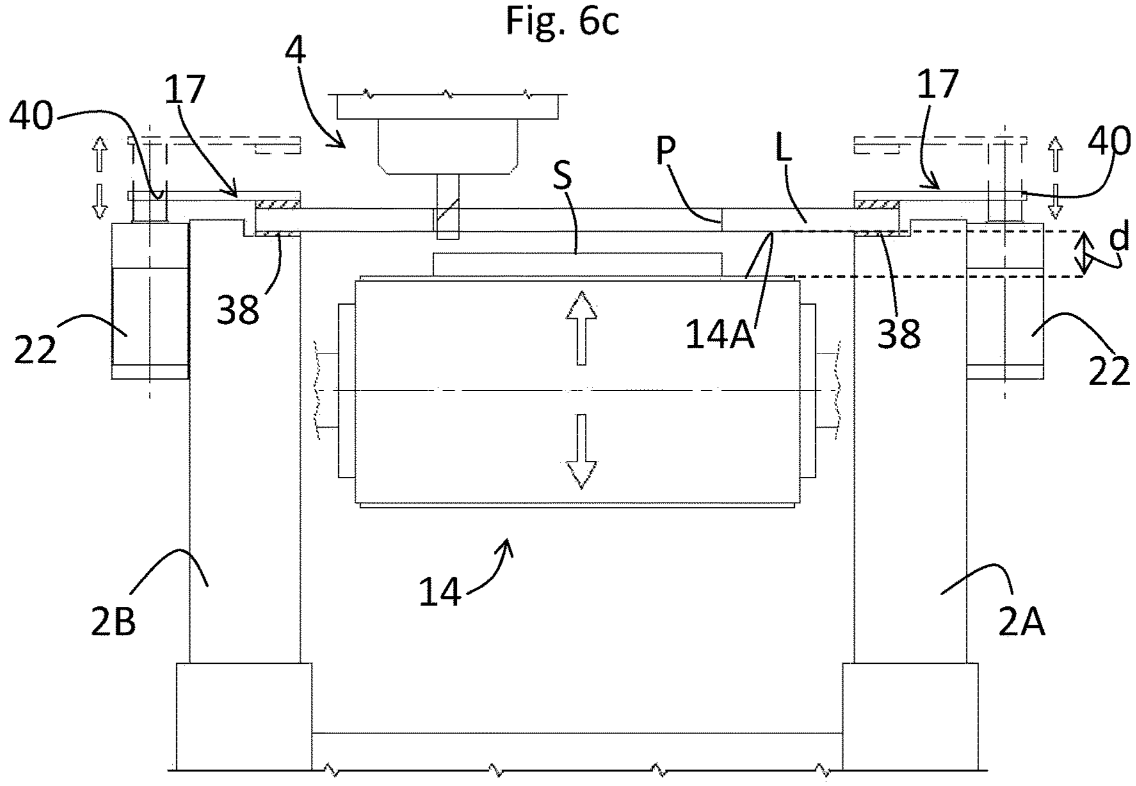

With reference to the second embodiment of the supporting and clamping means 17, the raised position in shown in FIG. 6*c* and the lowered position is shown in FIG. 6*d*.

As already mentioned above, the conveyor belt 14 is moved into the raised position preferably when surface machining operations must be carried out on the slab L so as to support the slab, and into the lowered position preferably when through-recesses P must be formed in the slab L, thus leaving a safety distance d between the slab L and the conveyor belt 14.

In this embodiment, the means 50 for moving the conveyor belt 14 are used before clamping of the slab L by the supporting and clamping means 17.

This occurs because during the feeding of the slabs the upper surface 14A of the conveyor belt 14 is in a raised position with respect to the supports 38; therefore, in order to allow the deposition of the slab L to be machined on the supports 38, the belt 14 must be lowered by means of the movement means 50 until its upper surface 14A is situated below the supports 38.

A particular embodiment of the means 50 for moving the conveyor belt 14 is shown in FIGS. 7 and 8. In particular, these movement means 50 are intended to move the conveyor belt 14 principally along the vertical direction and secondarily along a direction parallel to the feeding direction X of the slabs.

The final position of the conveyor belt 14 after raising by means of these movement means 50 is shown in broken lines in FIG. 7.

In particular, these movement means 50 comprise a pair of pivots 52 which are positioned below the conveyor belt 14 and are rotatable about respective axes Y.

Advantageously the pivots 52 are positioned at the two longitudinal ends of the belt 14 and the axes of rotation Y are horizontal and perpendicular to the direction of feeding X of the slabs L.

Each of the pivots 52 comprises a first arm 54 integral with the pivot 52 and the conveyor belt 14. In particular, the first arm comprises a first portion 56 integral with the pivot 52 and a second portion 58 integral with the conveyor belt 14.

The two portions 56, 58 are perpendicular to each other, namely an angle of about 90° is defined in the zone where the two portions 56, 58 are joined together.

The pivots 52 also comprise respective second arms 60; each second arm 60 is fixed to the pivot 52 in a position angularly offset with respect to the first arm 54, preferably at an angle close to 90°, as shown in FIG. 7.

As shown in FIG. 7, when the conveyor belt 14 is in the lowered position, the first portion 56 of the first arm 54 is substantially horizontal, while the second portion 58 of the first arm 54 and the second arm 60 are substantially vertical and directed downwards.

Moreover, the second arm 60 of at least one of the two pivots 52 is connected to a linear actuator 62 with a sliding stem 64.

The extension or retraction of the stem 64 of the linear actuator 62 causes the rotation of the second arm 60 and therefore the pivot 52 and consequently the raising or lowering of the conveyor belt 14 by means of the first arm 54.

In order to synchronize the rotation of the two pivots 52, the second arms 60 of the two pivots 52 may be connected together by means of a rigid connecting bar 66, shown more clearly in FIG. 7.

This embodiment of the movement means is shown only by way of a non-limiting example of the invention; in fact different movement means may also be provided, without thereby departing from the scope of protection of the present invention.

The present invention also envisages a method for processing the slabs of natural stone, agglomerate, ceramic or glass material which uses the machine 1 described above.

In particular, the method may comprise a step of positioning the conveyor belt 14 with its upper surface 14A in contact with the bottom surface of the slab L, as shown in FIGS. 3*c* and 6*c*, and/or a step of positioning the conveyor belt 14 with its upper surface 14A located at a predetermined distance d from the bottom surface of the slab L, as shown in FIGS. 3*d* and 6*d*.

As already indicated above, the first step is preferably performed before performing surface-machining of the slab, while the second step is performed preferably before forming a through-recess in the slab.

From the above description it is now clear how the machine according to the present invention is able to achieve advantageously the predefined objects.

In particular, by means of the movement means 50, it is possible to position the conveyor belt 14 at a predetermined distance from the slab L being machined or in contact therewith.

In the first case it is possible to prevent the belt from being damaged by the machining tool 4 or the slab from splintering following falling of the machining swarf. In the second case it is possible to prevent bending of the slab caused by the pressure of the machining tool during execution of the surface contouring operations.

Obviously, the above description of the embodiments applying the innovative principles of the present invention is provided by way of example of these principles and must therefore not be regarded as limiting the scope of the rights claimed herein.

For example, types of movement means different from those described or forms or configurations different from those of the other machine components may also be provided.

The invention claimed is:

1. A machine for processing slabs, comprising:

a device for transporting the slabs between two zones, at least one of which is a machining zone along a feeding direction;

means for supporting and clamping the slabs, designed to clamp the slabs in a machining position;

at least one tool for machining the slabs, mounted on a spindle, said at least one tool being operative in the machining zone; and means for moving said device, configured to move said device from a working position corresponding substantially to said machining position for machining the slabs into a position spaced at least vertically from said working position, and vice versa;

wherein said device comprises a conveyor belt; and wherein said means for moving are configured to move said conveyor belt from a raised working position corresponding substantially to said machining position for machining the slabs into a lowered position spaced from said raised working position, and vice versa; and wherein in the machining position the slab is supported by the supporting and clamping means.

2. The machine according to claim 1, characterized in that said means for moving are configured to move said conveyor belt along at least a vertical direction perpendicular to ground.

3. The machine according to claim 1, characterized in that said movement means are configured to move said conveyor belt into a further position raised with respect to the position for machining of the slabs.

4. The machine according to claim 1, characterized in that said means for moving comprise a pair of pivots which are positioned below said conveyor belt and are rotatable around respective axes.

5. The machine according to claim 4, characterized in that each of said pair of pivots comprises at least one first arm integral with the pivot and integral with said conveyor belt.

6. The machine according to claim 5, characterized in that said pair of pivots comprise respective second arms, the second arm of at least one of said pair of pivots being connected to a linear actuator so as to cause the rotation of said at least one pivot.

7. The machine according to claim 6, further comprising a connecting bar designed to connect the second arms of said pair of pivots so as to allow the synchronous rotation of said pair of pivots.

8. The machine according to claim 1, characterized in that said means for supporting and clamping comprise two pairs of cylinders positioned laterally on opposite sides of the conveyor belt.

9. The machine according to claim 8, characterized in that said two pairs of cylinders are provided with pistons intended to raise the slabs with respect to the conveyor belt and to support the slabs during machining.

10. The machine according to claim 9, characterized in that said means for supporting and clamping comprise two pairs of abutments which are aligned with said two pairs of cylinders in a raised position along a vertical direction and are mounted on a fixed frame of the machine.

11. The machine according to claim 10, further comprising means for adjusting the position of said cylinders and said abutments with respect to said conveyor belt.

12. The machine according to claim 10, characterized in that the two pairs of said cylinders are located at a predetermined distance, a width of said conveyor belt being similar to said predetermined distance.

13. The machine according to claim 8, characterized in that said means for supporting and clamping comprise at least two pairs of grippers mounted on pistons of said two pairs of cylinders and slidable along a vertical direction and at least two pairs of substantially horizontal supports which are aligned with said at least two pairs of grippers along the vertical direction in the lowered position.

14. The machine according to claim 13, further comprising a frame with a pair of sidewalls located at a predetermined distance, a width of said conveyor belt being similar to said predetermined distance.

15. The machine according to claim 1, characterized in that the machine comprises means for aligning the slabs with respect to said conveyor belt.

16. A method for processing slabs of stone, ceramic or glass material, which said method uses the machine according to claim 1, further comprising a step of positioning the conveyor belt with its upper surface in contact with a bottom surface of the slabs during surface-machining of the slabs.

17. A method for processing slabs of stone, ceramic or glass material, which said method uses the machine according to claim 1, further comprising a step of positioning the conveyor belt with its upper surface at a predetermined distance from a bottom surface of the slab during formation of through-recesses in the slab so as to collect a machining swarf.

* * * * *